US006680595B2

(12) United States Patent
Ito

(10) Patent No.: US 6,680,595 B2
(45) Date of Patent: Jan. 20, 2004

(54) CONTROL METHOD AND APPARATUS OF SCREW FASTENING APPARATUS

(75) Inventor: Takaya Ito, Moriguchi (JP)

(73) Assignee: Estic Corporation, Osaka (JP)

( * ) Notice: Subject to any disclaimer, the term of this patent is extended or adjusted under 35 U.S.C. 154(b) by 0 days.

(21) Appl. No.: 10/322,627

(22) Filed: Dec. 19, 2002

(65) Prior Publication Data

US 2003/0090227 A1 May 15, 2003

Related U.S. Application Data

(63) Continuation of application No. PCT/JP01/04920, filed on Jun. 11, 2001.

(30) Foreign Application Priority Data

Jun. 19, 2000 (JP) ....................................... 2000-182722

(51) Int. Cl.[7] .................................................. H02P 7/00

(52) U.S. Cl. ....................... 318/434; 318/432; 318/433; 388/937; 173/4; 173/11; 173/176; 173/181; 173/190

(58) Field of Search ................................ 318/432–434; 388/937; 173/4, 11, 176, 190, 181

(56) References Cited

U.S. PATENT DOCUMENTS 3,975,954 A * 8/1976 Barnich ....................... 73/139
4,066,942 A * 1/1978 Bardwell et al. ........... 318/434
5,154,242 A * 10/1992 Soshin et al. ............... 173/178
5,181,575 A * 1/1993 Maruyama et al. ......... 173/180
6,378,623 B2 * 4/2002 Kawarai ..................... 173/180

FOREIGN PATENT DOCUMENTS

JP 61-178186 8/1986
JP 5-131377 5/1993
JP 7-308865 11/1995
JP 8-112776 5/1996

* cited by examiner

*Primary Examiner*—Trina I. Duda
(74) *Attorney, Agent, or Firm*—McDermott, Will & Emery

(57) ABSTRACT

It is an object of the present invention to overcome various drawbacks of a conventional oil pulse wrench by using an electric motor, to reduce a reaction force and to fasten a screw with high precision. To achieve the object, the invention provides a control method of a screw fastening apparatus using an electric motor as a rotation driving source, the method comprising the steps of; intermittently supplying current pulse DP to the motor, detecting an actual torque at predetermined time intervals, maintaining a current value when a detected torque value does not exceed a maximum value of past detected torques value and increasing the current value by a predetermined amount when the detected torque value exceeds the maximum value of the past detected torque value, and stopping the supply of the current pulse DP when the detected torque value reaches a target value TQJ.

7 Claims, 6 Drawing Sheets

CONTROL METHOD AND APPARATUS OF SCREW FASTENING APPARATUS

This is a continuation of PCT/JP01/04920, filed Jun. 11, 2001.

FIELD OF THE INVENTION

The present invention relates to a control method and a control apparatus of a screw fastening apparatus, and more particularly, to a screw fastening apparatus whose reaction force is reduced so that the screw fastening apparatus can be held by one hand.

DESCRIPTION OF THE PRIOR ART

Conventionally, a power-assisted screw fastening apparatus is used for fastening a bolt or a screw with a predetermined torque. A screw fastening apparatus is generally controlled such that its shaft is continuously rotated to fasten a screw and when the torque reaches a certain value, the power is cut off or a clutch is slid.

Meanwhile, an operator holds the screw fastening apparatus with his/her hand for fastening a screw with respect to a work on a conveyer in various assembly lines in many cases.

In such a case, it is desired that the screw fastening apparatus can be held with one hand in view of operability. In the case of a one-handed type screw fastening apparatus, reaction of screw fastening operation must be received by one hand. Therefore, as the fastening torque is increased, there is a problem that its reaction becomes a load acting on the operator.

In the case of the above-mentioned apparatus whose shaft rotates continuously, since the reaction force of the fastening torque is received by the operator's hand. directly, the load acting on the operator is great. In order to reduce the reaction force, an impact type apparatus utilizing impact by rotor inertia of a rotor is used.

In the conventional impact type screw fastening apparatus, however, since a screw is fastened through a collision energy generating mechanism and a socket, precision of the fastening torque is largely varied depending upon variation of transmitting efficiency of these members, and this apparatus is not suitable for fastening a screw with high precision. In order to enhance the precision, there is used a method in which a clutch mechanism is provided on a tip end of a shaft, and the clutch is slid to control the torque when excessive torque is inputted.

Under such circumstances, a screw fastening apparatus called oil pulse wrench having both of two functions (impact generating section and clutch mechanism) becomes widespread to solve the two problems, i.e., of reducing the reaction force and of enhancing the precision.

The oil pulse wrench usually includes an oil pulse section in which an air motor which is a driving source and a bypass valve which generates impulse-like oil pressure so as to use the generated oil pressure as a clutch mechanism are integrally constituted together.

However, the oil pulse wrench has the following structural problems.

(1) In order to control the fastening torque, it is necessary to adjust a hydraulic pressure of the bypass valve functioning as the clutch mechanism, but the hydraulic pressure must be adjusted whenever the target torque is changed.

(2) The oil pulse generating section is a mechanism for generating the impulse by compressing and decompressing the oil while rotating. Therefore, oil and constituent parts such as a compression blade are deteriorated and worn as being used. Thus, it is necessary to frequently readjust and replace the parts.

(3) Since the characteristics of the oil pulse wrench are varied depending upon an oil temperature also, there is a possibility that the precision of the fastening torque and ability of fastening step is varied.

(4) A heat radiation of the oil pulse section is great due to repetition of compression and decompression of oil. Therefore, the pulse generating mechanism is cooled utilizing emission of an air motor. For this reason, if the pulse generating mechanism is not cooled, its temperature is increased up to approximately 100° C. for some minutes' operation. Thus, there is a possibility that problems occur with respect to safety and stability of the function.

(5) For the above reasons, in the case of the oil pulse wrench, the necessity of using an air motor as a driving source is high and flexibility in selection of the driving source is low. Incidentally, an air motor has low energy efficiency as compared with an electric motor, and has a problem of dust and mist.

SUMMARY OF THE INVENTION

The present invention has been accomplished in view of the above problems, and it is an object of the invention to provide a screw fastening apparatus as well as a control method and a control apparatus of the screw fastening apparatus in which the various drawbacks of the conventional oil pulse wrench are solved by using an electric motor, the reaction force is small, and the precision is good.

A method according to the present invention is a control method of a screw fastening apparatus using an electric motor as a rotation driving source in which an output torque of the motor is generated like pulses, as well as an actual torque is detected at every predetermined time interval, the output torque is controlled such that the output torque is maintained when a detected torque value does not exceed a maximum value of the detected torque values detected heretofore, and such that the output torque is increased by a predetermined amount when the detected torque value exceeds the maximum value of the detected torque values detected heretofore, and the motor is stopped when the detected torque value reaches a target value.

Further, current pulse is intermittently supplied to the motor, an actual torque is detected at every predetermined time interval, a current value is maintained when a detected torque value does not exceed a maximum value of the detected torque values detected heretofore, and the current value is increased by a predetermined amount when the detected torque value exceeds the maximum value of the detected torque values detected heretofore and the supply of the current pulse is stopped when the detected torque value reaches a target value.

Preferably, the current pulse is such that ON-time and/or OFF-time thereof can be variably set.

Size of the detected torque value is judged and an increase of the current value is calculated irrespective of ON and OFF of the current pulse.

The motor is controlled in speed and allowed to rotate at high speed until the screw sits, and after the screw seats, the control as described above is carried out.

Further, pulse-like current that is gradually increased is supplied to the motor, thereby generating gradually increasing torque like pulses in the motor, and the motor is stopped when a maximum value of the torque reaches a target value.

An apparatus according to the present invention includes torque detecting means for detecting a fastening torque of the screw by the motor, setting means for setting a target value of the fastening torque, a current command calculating section which intermittently supplies current pulse to the motor, which calculates at predetermined time intervals to maintain a current value when a detected torque value does not exceed a maximum value of the detected torque values detected heretofore and which calculates to increase the current value by a predetermined amount when the detected torque value exceeds the maximum value of the detected torque values detected heretofore and a stop control section for stopping the supply of the current pulse when the detected torque value reaches the target value.

DESCRIPTION OF THE PREFERRED EMBODIMENTS

Figure 1:
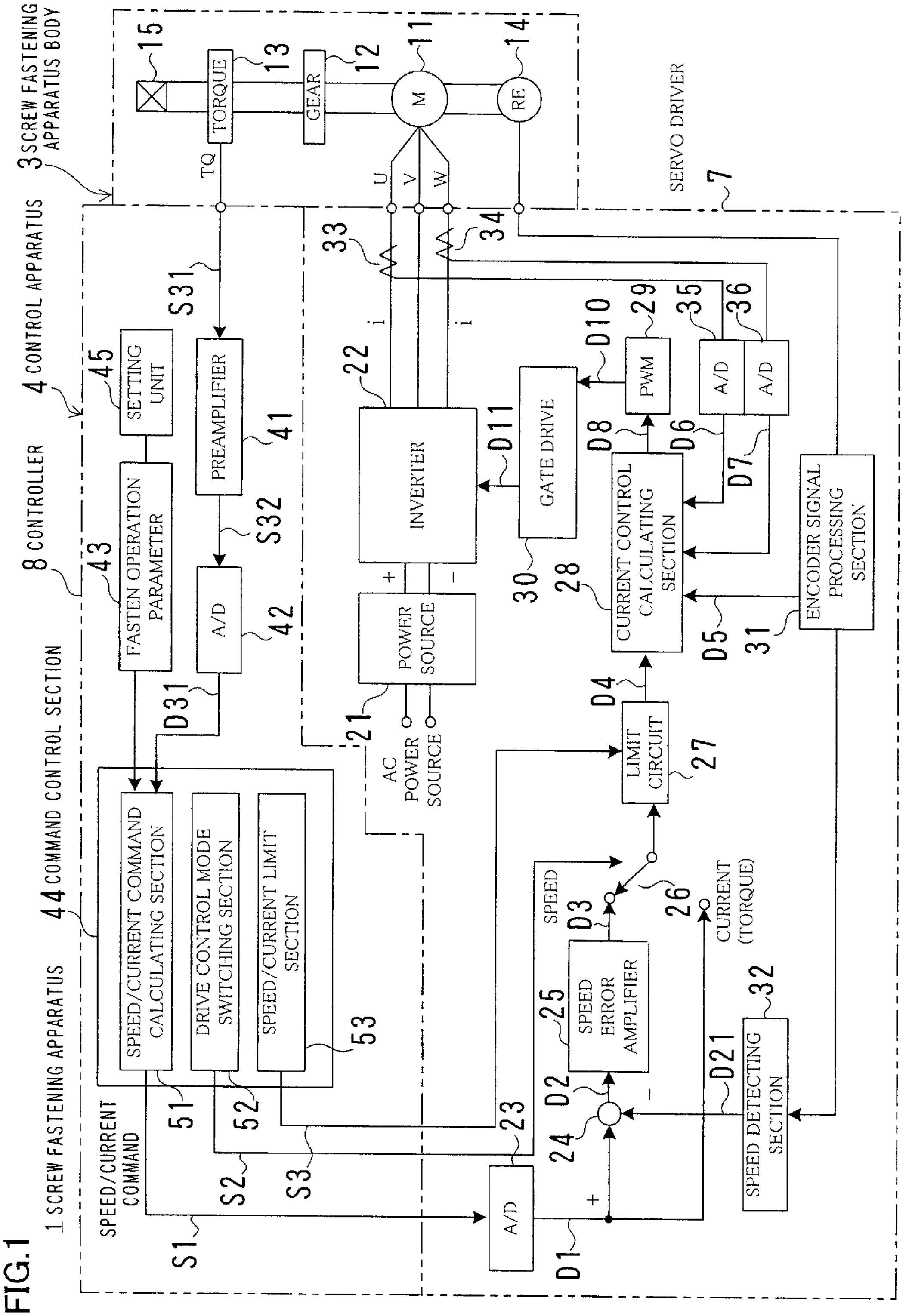
FIG. 1 is a block diagram showing the entire structure of a screw fastening apparatus of the present invention.

FIG. 1 is a block diagram showing the entire structure of a screw fastening apparatus 1 of the present invention.

In FIG. 1, the screw fastening apparatus 1 includes a screw fastening apparatus body 3, and a control apparatus 4 having a servo driver 7 and a controller 8.

The screw fastening apparatus body 3 includes a motor 11, a deceleration gear 12, a torque sensor 13, an encoder 14, an output shaft 15, a casing (not shown), switches (not shown) and the like.

The motor 11 is a three-phase AC servomotor and is a rotation driving source for rotating and driving the output shaft 15 through the deceleration gear 12.

The deceleration gear 12 decelerates the rotation of the motor 11 and a planetary gear is used for example.

The torque sensor 13 detects a screw fastening torque TQ by the motor 11 and outputs a detection signal S31. In this embodiment, the torque sensor 13 is directly connected to the output shaft 15 so that a torque generated in the output shaft 15 among torques outputted from the motor 11, i.e., a torque for fastening a screw (fastening torque) which is a load is detected.

The encoder 14 detects rotation speed of the motor 11 and outputs pulse signals of certain number proportional to the rotation number of the motor 11.

The screw fastening apparatus body 3 has a handle grip that the operator grips with one hand and is entirely covered with a casing having such a shape that the operator can handle with one hand. ON and OFF of a power source is controlled by operating a switch (not shown).

The servo driver 7 includes power source 21, an inverter 22, an AD converter 23, an adder 24, a speed error amplifier 25, a switching section 26, a limit circuit 27, a current control calculating section 28, a PWM circuit 29, a gate drive 30, a encoder signal processing section 31, a speed detecting section 32, current detectors 33 and 34 and AD converters 35 and 36.

The controller 8 includes a preamplifier 41, an AD converter 42, a parameter storing section 43 and a command control section 44. The command control section 44 is provided with a speed/current command calculating section 51, a drive control mode switching section 52 and a speed/current limit section 53.

The power source 21 rectifies AC electric power of AC 100 volts and converts the power to DC electric power of appropriate various voltages, for example. The DC electric power is supplied to the inverter 22 and other circuits and parts.

The AD converter 23 inputs a speed/current command (speed/torque command) S1 that is outputted from the speed/current command calculating section 51, and outputs command data D1 of digital value in accordance with the command S1. The command data D1 becomes speed command data D1S or current (torque) command data D1T in accordance with a driving mode.

The adder 24 subtracts speed data D21 outputted from the speed detecting section 32 from the command data D1 outputted from the AD converter 23.

The speed error amplifier 25 differentially amplifies speed command data D2 outputted from the adder 24.

The switching section 26 switches between speed command data D3 outputted from the speed error amplifier 25 and the current command data D1T outputted from the AD converter 23 in accordance with a control switch command S2 from the drive control mode switching section 52. That is, the switching section 26 is switched such that the limit circuit 27 is supplied with the speed command data D3 outputted from the speed error amplifier 25 when the speed control is conducted and the limit circuit 27 is supplied with the current command data D1T outputted from the AD converter 23 when the current control (torque control) is conducted.

The limit circuit 27 controls to limit the rotation speed of the motor 11 or the current maximum value based on a speed/current limit command (speed/torque limit command) S3 from the speed/current limit section 53.

The current control calculating section 28 calculates a current value to be fed to the motor 11 based on command data D4 outputted from the limit circuit 27, data D5 outputted from the encoder signal processing section 31 and current data D6 and D7 respectively outputted from the AD converters 35 and 36 and outputs the calculated value as current command data D8.

The PWM circuit 29 modulates a pulse width based on the current command data D8 outputted from the current control calculating section 28 and outputs a pulse signal D10 whose pulse width was modulated.

The gate drive 30 generates a pulse signal D11 for turning a gate of each switching element of the inverter 22 ON and OFF based on the pulse signal D10.

The encoder signal processing section 31 processes the pulse signal outputted from the encoder 14. The speed detecting section 32 detects a speed based on a signal outputted from the encoder signal processing section 31 and outputs speed data D21 indicative of a value corresponding to the speed.

The current detectors 33 and 34 detect current (motor current) i of u-phase and w-phase flowing to the motor 11, respectively. The AD converters 35 and 36 convert the motor current i respectively detected by the current detectors 33 and 34 into current data D6 and D7 of digital values, respectively.

The preamplifier 41 amplifies the detection signal S31 detected by the torque sensor 13. The AD converter 42 converts a signal S32 outputted from the preamplifier 41 into torque data D31 of digital value and outputs the same to the speed/current command calculating section 51. The torque data D31 is data indicating actual fastening torque TQ.

The parameter storing section 43 stores various parameters necessary for calculation of the speed/current command calculating section 51 or the like. Examples of the parameters are a minimum current value, a measurement start torque, a seating torque TS, a target torque TQJ, a maximum value TQM of the fastening torque TQ and a current slope θ. These parameters are set by a setting unit 45. A digital switch, a numeric keypad, a touch panel or a changeover switch is used as the setting unit 45.

The speed/current command calculating section 51 calculates a speed command value and a current value for command based on the torque data D31 from the AD converter 42 and a parameter from the parameter storing section 43 and outputs the calculated value as a speed/current (torque) command S1.

A current command S1T in the speed/current (torque) command S1 outputs a current value for command only when a later-described current pulse DP is during ON-time TN and sets the current command S1T to zero during OFF-time TF.

The drive control mode switching section 52 switches between a speed control mode and a current control (torque control) mode.

In the speed control mode, control is conducted such that the rotation speed of the motor 11 becomes a speed set by the speed command data D1S. Control is conducted such that the current flowing to the motor 11 becomes the set speed even if a load is varied. In the speed control mode, a limit value of current can be provided. A maximum current value is limited by the limit value of current. Therefore, the actual speed may not reach the set speed in some cases depending upon a load state.

In the current control mode, control is conducted such that current flowing to the motor 11 becomes a current value set by the current command data D1T. The rotation speed of the motor 11 is varied depending upon the set current value and the state of the load. In the current control mode, a limit value of rotation speed can be provided. The current value is limited if the rotation speed of the motor 11 reaches the limit value.

By the switching section 26, the speed command data D3 is selected in the speed control mode and the current command data D1T is selected in the current control mode.

In the fastening operation at automatic operating, the fastening apparatus is first driven in the speed control mode to rotate the output shaft 15 at high speed. If the fastening torque TQ generated in the output shaft 15 reaches a seating torque TS set previously, it is judged that the screw which is a load sits, and the mode is switched to the current control mode. In the current control mode, current flowing to the motor 11 is controlled so that output torque indicated by the current command data D1T is obtained.

In the manual operation, either mode is set in accordance with operation of the changeover switch (not shown).

The speed/current limit section 53 sets the maximum values of the speed and the current (torque) and the set values are given to the limit circuit 27.

The controller 8 is constituted using a CPU, a ROM, a RAM and other peripheral elements. The speed/current command calculating section 51, the drive control mode switching section 52 and the speed/current limit section 53 described above are realized by executing a program stored in the ROM by the CPU.

The controller 8 comprises an input device for inputting data or command, a display for displaying good or bad result of fastening and a communication apparatus for communication with the other data processing system or control apparatus.

Next, a principle of the control method of the present embodiment will be explained.

In the control of fastening a screw, it is important to fasten the screw with high precision with the final fastening torque TQ which coincides with the set target torque (torque target value) TQJ. Further, it is desirable that the time required for completing the fastening operation is as short as possible. Problems for fastening a screw with high precision are as follows:

(1) It is necessary to immediately stop the motor 11 when the fastening torque TQ detected by the torque sensor 13 reaches the target torque TQJ.

Since inertia acts on the motor 11 and the deceleration gear 12, however, time (stopping time) is absolutely required to stop the motor.

(2) An increasing rate of the fastening torque TQ with respect to an input of a constant force is varied depending upon hardness of a load such as a bolt or work, the presence or absence of packing and washer, a diameter of a bolt, lead pitch and length thereof. Further, the increasing rate of the fastening torque TQ is also varied between initial stage and final stage of the fastening operation.

The above problem (1) can be solved by reducing the inertia to reduce the rotation speed, or by inputting the stopping torque to the motor 11 earlier. Concerning the problem (2), since the increasing rate of the fastening torque TQ is varied depending upon the work, the final fastening torque TQ is varied even if the stopping time is the same.

To solve this problem, the rotation number suitable for the torque increasing rate of the work is obtained by slowly increasing the fastening torque TQ. With this, it is possible to stop the motor 11 instantly in accordance with the increase of the torque, and the variation in fastening torque can be reduced.

The current and the torque of the motor 11 are substantially proportional to each other. When the screw is ideal, if the current is gradually increased in slope form the output torque is also increased in slope form, and the fastening torque TQ is also increased proportionally.

In the actual case, however, the increasing rate of the fastening torque TQ is varied from moment to moment as described in the problem (2). Therefore, in the case where the fastening torque TQ is not increased, even if the current is increased with a constant slope (current slope), the current becomes acceleration energy of the motor 11 and appears as increase in speed. When the fastening torque TQ of the work is increased after the speed was increased, the fastening torque TQ is increased more rapidly than the current slope by the acceleration and the output torque at that time. As a result, the final fastening torque TQ is further varied.

In order to solve this problem, the fastening torque TQ is always monitored and the control is conducted such that the current is increased as the fastening torque TQ is increased.

Thus, it is possible to control such that the final fastening torque TQ becomes constant irrespective of whether the current flowing to the motor 11 is used for increasing the rotation speed (acceleration energy) or the current is used for the actual fastening operation, i.e., irrespective of driving state or state of work.

Next, a method of reducing the reaction force of the fastening torque TQ will be explained.

An operator grips the handle grip of the screw fastening apparatus body 3 and operates with one hand. In order to reduce the reaction force to the operator, the motor 11 is not actuated continuously by allowing the current to continuously flow, but is actuated intermittently by pulse-like current. That is, pulse-like current (current pulse DP) is intermittently supplied to the motor 11. The current pulse DP has ON-time TN and OFF-time TF which can be variably set.

An actual fastening torque TQ is detected at constant time intervals ts irrespective of ON or OFF of the current pulse DP. Calculation is performed for maintaining the current value when the fastening torque TQ (detected torque value) did not exceed the maximum value TQM of the past fastening torque TQ, and if the fastening torque exceeded the maximum value TQM of the past fastening torque, calculation is conducted for increasing the current value by a predetermined amount.

Therefore, when the fastening torque TQ is being increased, the maximum value TQM is updated at the time interval ts. The maximum value TQM is stored in the parameter storing section 43 of the controller 8.

The predetermined amount to be increased may be an increase amount of the current slope θ (see FIG. 5) corresponding to the time interval ts when such a processing is conducted, for example. A value of the current slope θ (increase amount with respect to the time intervals ts) can be set to various values and can be changed.

For example, ON-time TN of the current pulse is set to 0.02 sec, OFF-time TF is set to 0.02 sec, the time intervals ts is set to 0.5 msec. The above described calculation and control are repeated in accordance with the set values until the fastening torque TQ reaches the target torque TQJ. In this case, the above-described judgement and processing are repeated every 0.5 msec. The judgement and processing are conducted irrespective of ON or OFF of the current pulse. During OFF-time TF, the current value may be increased in some cases depending upon the kind of processing, but current which actually flows to the motor 11 is zero and next ON-time TN, the current value which is a result of the processing is given as an initial value.

Although the ON-time TN is 0.02 sec, since there is a backlash in the deceleration gear 12 and play in a joint portion, the time in which torque is transmitted to the work while the current pulse is ON is approximately 0.01 to 0.005 sec and torque is instantaneously generated. Therefore, torque is instantaneously added to the handle grip gripped by the operator. Since energy for accelerating the screw fastening apparatus body 3 in a direction opposite to the fastening direction is very small per unit time, however, the acceleration energy is absorbed by the operator's hand during the subsequent OFF-time TF.

Since the above operation is continuously repeated, the reaction force added to the operator is reduced by a difference between the generation of torque and absorption time.

In this manner, the control of the fastening torque can precisely be conducted irrespective of disturbance, work and driving state. Additionally, since the driving pattern does not affect the precision, the reaction force can be reduced by the intermittently driving.

Next, procedure and action of the fastening steps of the screw fastening apparatus 1 will be explained with reference to the flowcharts and drawings showing the action state.

Figure 2:
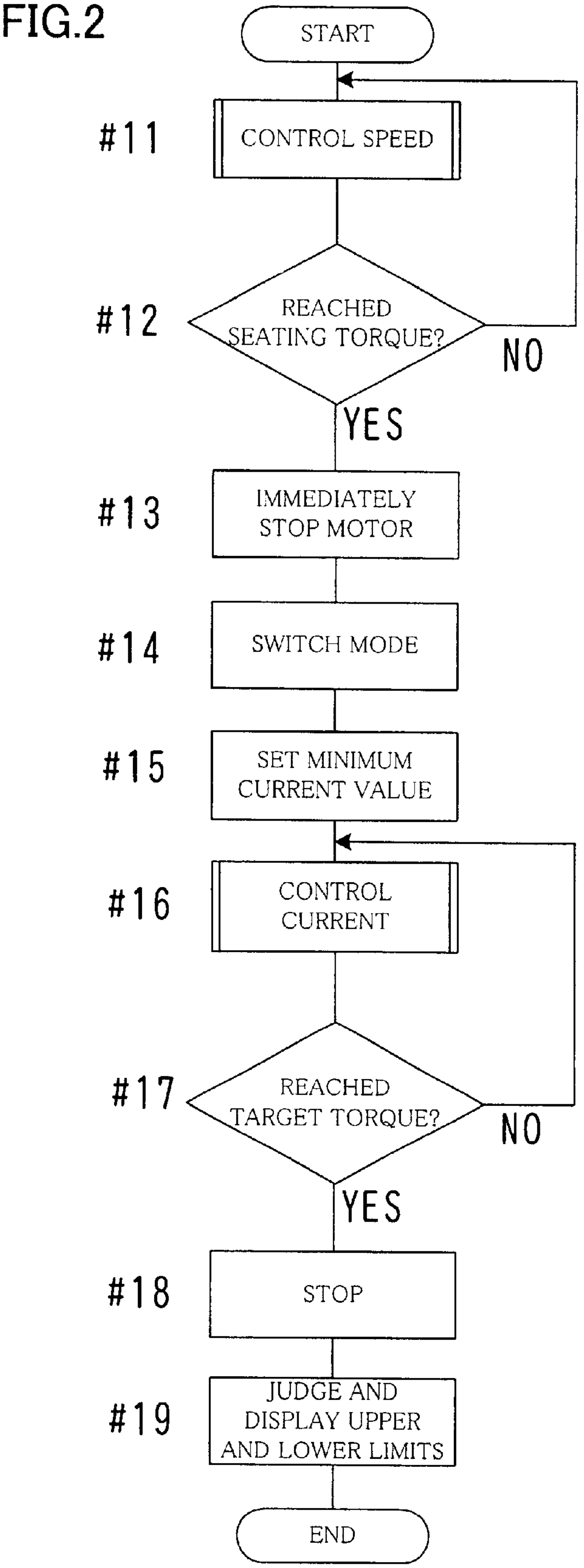
FIG. 2 is a flowchart showing a procedure of a fastening operation of the screw fastening apparatus.
Figure 3:
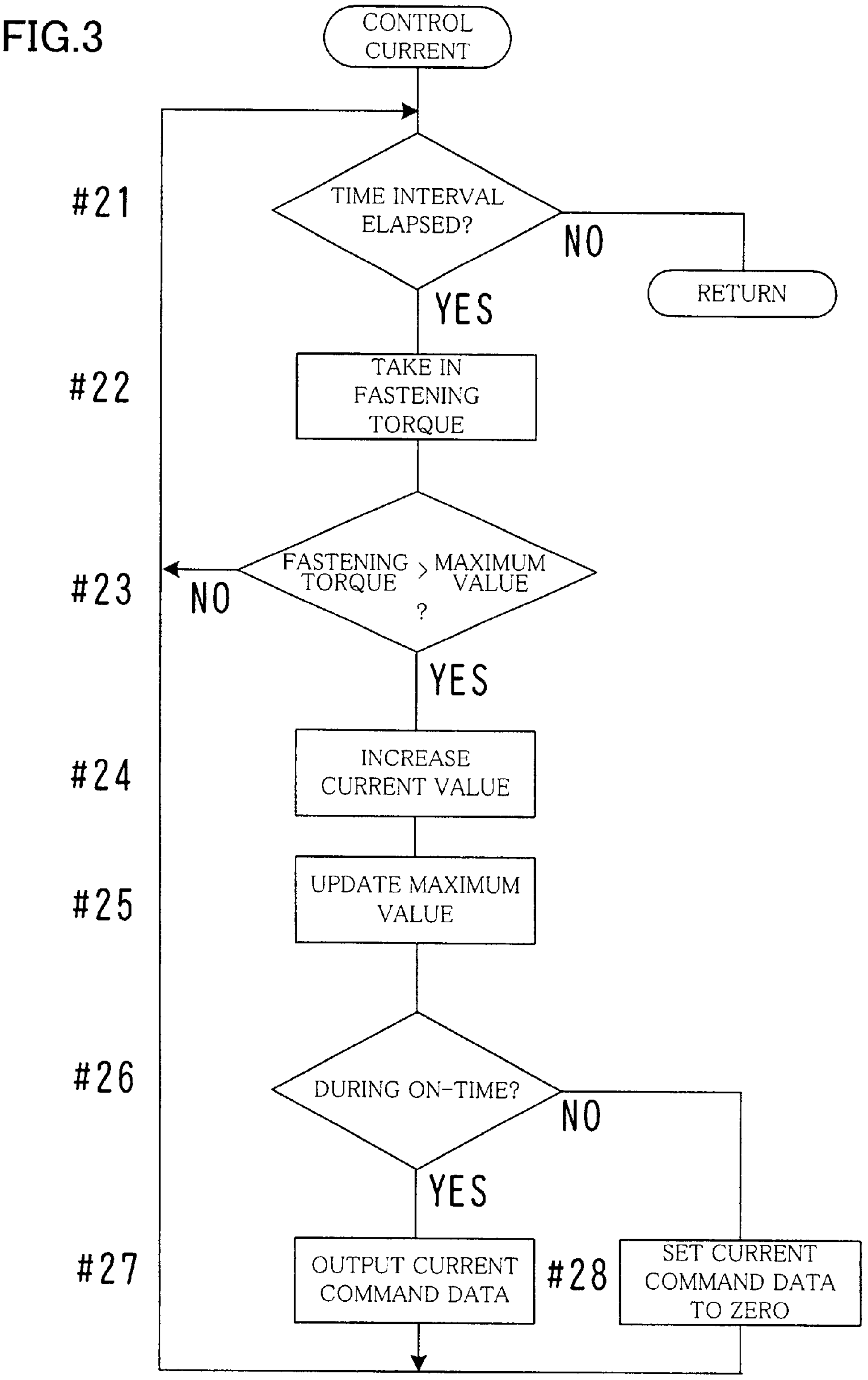
FIG. 3 is a flowchart showing a current control routine.
Figure 4:
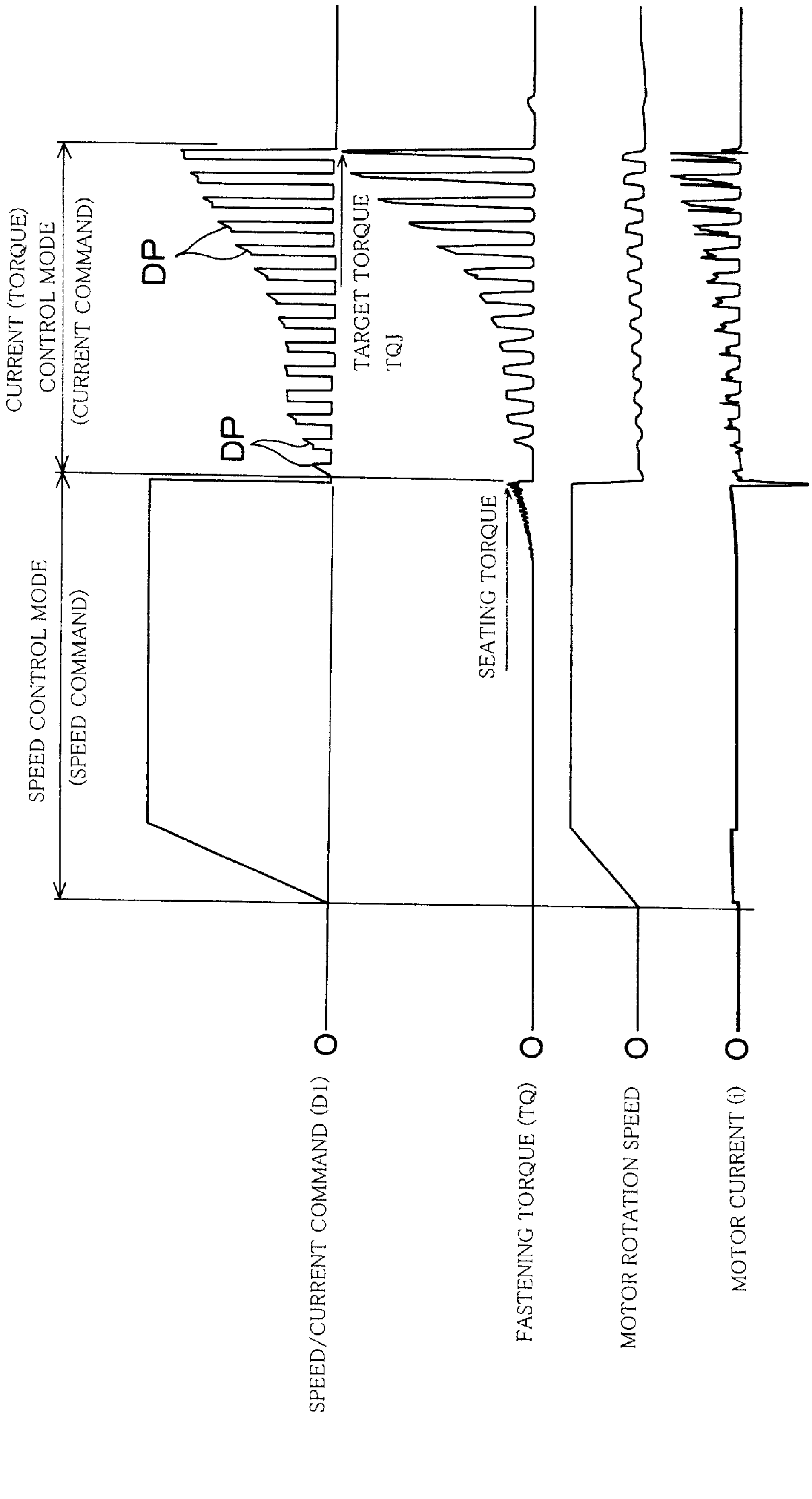
FIG. 4 is a view showing the entire state of the screw fastening operation by the screw fastening apparatus.
Figure 5:
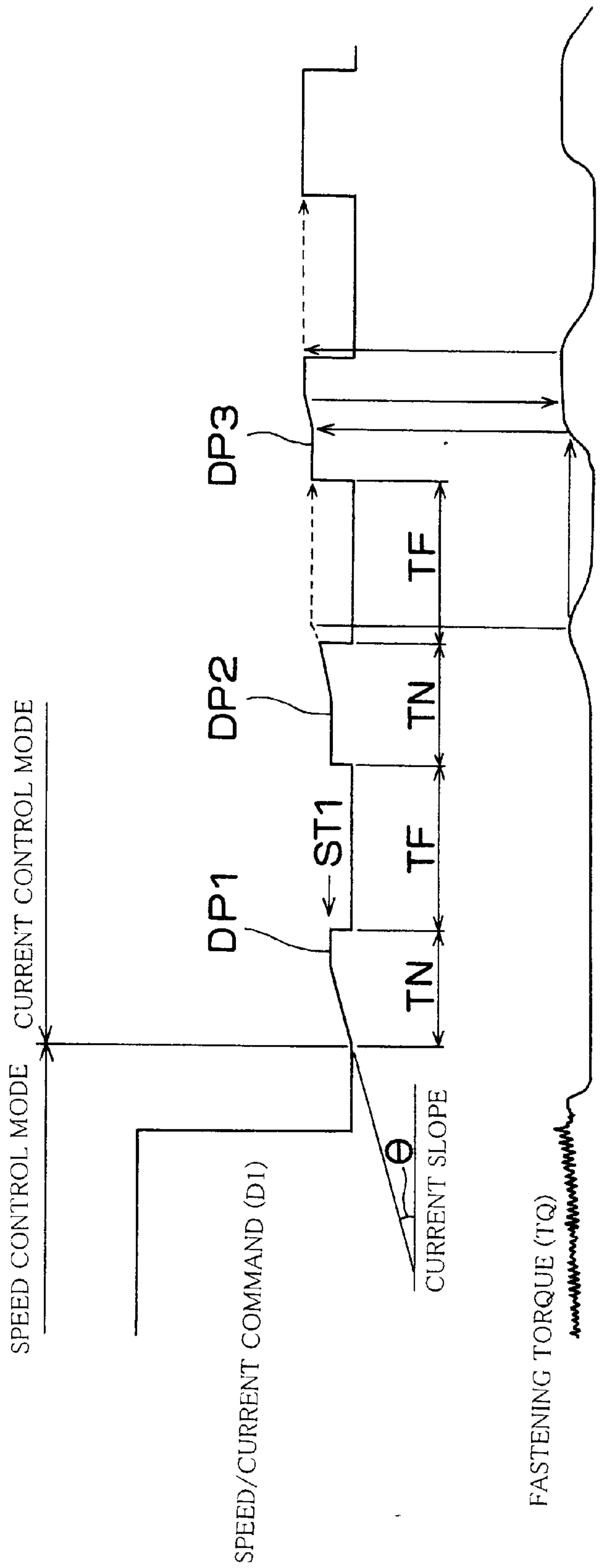
FIG. 5 is an enlarged view showing an operation state in the vicinity of a boundary between a speed control mode and a current control mode.
Figure 6:
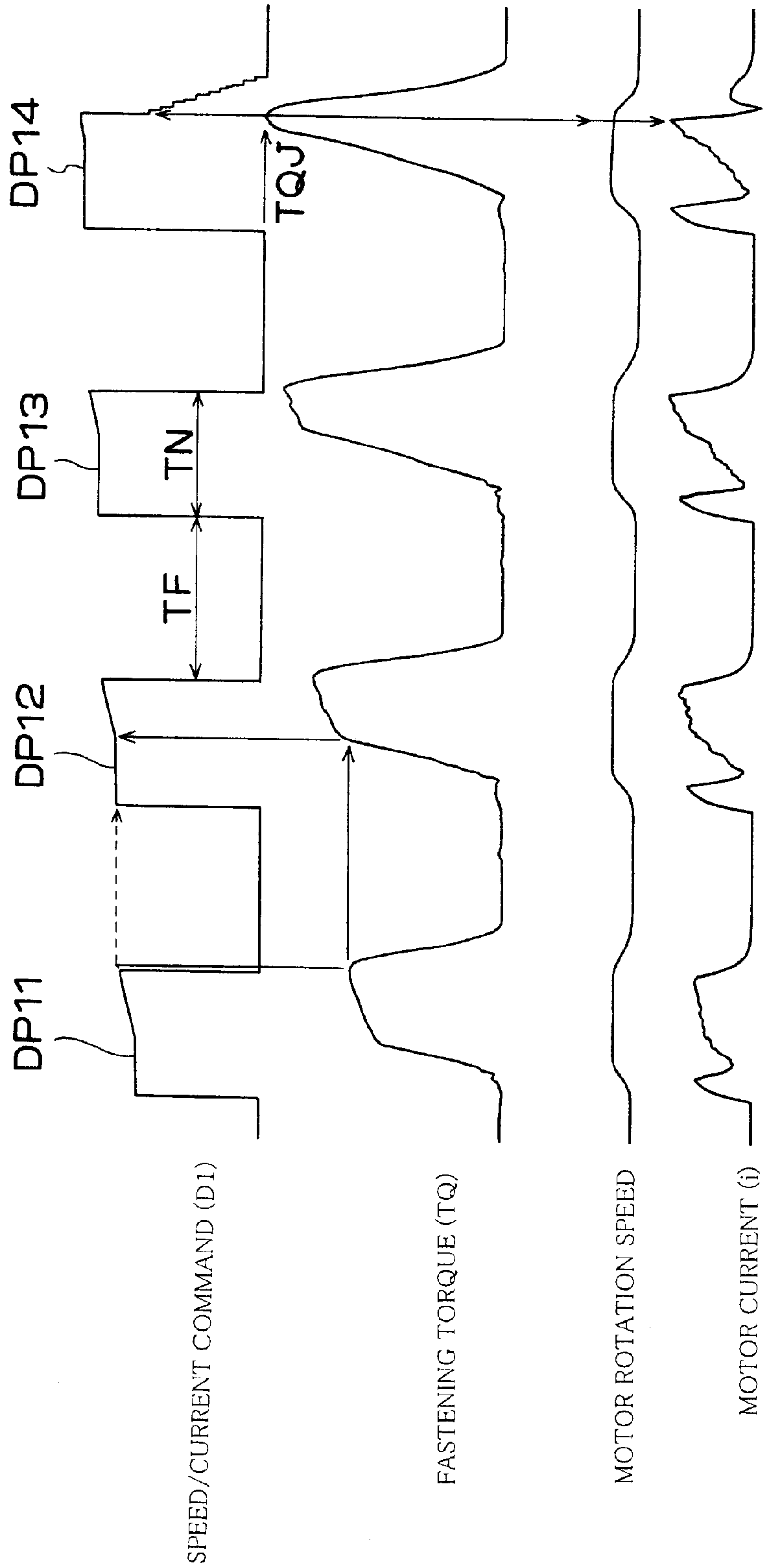
FIG. 6 is an enlarged view showing an operation state near the end of the current control mode.

FIG. 2 is a flowchart showing a procedure of a fastening operation of the screw fastening apparatus 1, FIG. 3 is a flowchart showing a current control routine, FIG. 4 is a view showing the entire state of the screw fastening operation by the screw fastening apparatus 1, FIG. 5 is an enlarged view showing an operation state in the vicinity of a boundary between a speed control mode and a current control mode and FIG. 6 is an enlarged view showing an operation state near the end of the current control mode.

As shown in FIG. 4, the fastening operation includes an operation in the speed control mode and an operation in the current control mode.

First, in FIG. 2, speed control is conducted by the speed control mode (#11). In the speed control, the rotation speed of the motor 11 is set by the speed command data D1S. The speed command value is gradually increased and the rotation speed of the motor 11 is also increased. If the rotation speed reaches a predetermined value, the rotation speed is maintained at a constant value. With this control, the motor 11 rotates at high speed and temporarily fastening operation is carried out until the screw sits. During this time, if the fastening torque TQ exceeds the measurement start torque, measurement is started.

If the fastening torque TQ reaches the seating torque TS (YES in #12), it is judged that the screw sit and the motor 11 is immediately stopped (#13).

To immediately stop the motor 11, the speed command value of the motor 11 is set to zero and current for locking the motor 11 is allowed to flow to apply brake. Then, the mode is switched to the current control mode (#14).

In the current control mode, first, a minimum current value ST1 required for idling the motor 11 is set as the current command data D1T (#15).

Then, while the fastening torque TQ reaches the target torque TQJ (NO in #17), the current is controlled (#16).

If the fastening torque TQ reaches the target torque TQJ (YES in #17), the motor 11 is stopped (#18). The supply of the current pulse DP is stopped to stop the motor 11 and current flowing to the motor 11 is set to zero.

Then, it is judged whether a final fastening torque TQ and maximum values TQM which appeared heretofore are within a range of set upper and lower limit values and a result of the judgement is displayed on a display screen (#19).

In the current control, current flowing to the motor 11, i.e., output torque of the motor 11 is set by the current command data D1T.

In FIG. 3, processing of step #23 and subsequent steps are carried out whenever the time interval ts is elapsed (YES in #21).

That is, the fastening torque TQ is measured and the value is incorporated (#22). The incorporated fastening torque TQ and the maximum value TQM of the past fastening torque TQ are compared. If the value does not exceed the maximum value TQM (No in #23), the processing returns to step #21 and waits for the lapse of time interval ts.

If the value exceeds the maximum value TQM, the current value for command is increased by the predetermined amount (#24). The maximum value TQM is updated by the fastening torque TQ at that time (#25).

During ON-time TN (Yes in #26), the current value for command is outputted as the current command data D1T (#27). During OFF-time TF, the current command data D1T is set zero (#28). However, the current value for command is maintained without being cleared, even if the current command data D1T is set zero.

Accordingly, as shown in FIG. 5, a first current pulse DP1 is outputted immediately after the current control mode is set, for example. In the current pulse DP1, the current starts from zero and the current is increased by inclination of the current slope θ. When the current value reaches the set minimum current value ST1, increase of the current is stopped and the value is maintained. In this time, since the output torque of the motor 11 is normally smaller than the seating torque TS, the motor 11 does not rotate.

During the subsequent OFF-time TF, the current command data D1T is zero. With this, current flowing to the motor 11 becomes zero. During this time also, the processing of steps #21 to 25 are carried out. A value of the current command data D1T and a value of current actually flowing to the motor 11 do not coincide with each other because of electromagnetic effect and excessive phenomenon of the motor 11.

In the next current pulse DP2 shown in FIG. 5, since the fastening torque TQ exceeded the last maximum value TQM near the middle of the ON-time TN, the current value is increased. Thereafter, the fastening torque TQ is increased every time interval ts. Therefore, whenever the fastening torque TQ is increased, the maximum value TQM is updated and the current value is increased.

Even if the ON-time TN of the current pulse DP2 is finished and the current command data D1T to the motor 11 becomes zero, since the motor 11 is rotated by the inertia, the fastening torque TQ is increased, the maximum value TQM is updated and the current value is increased also.

In the next current pulse DP3, near the end of the first half of the ON-time TN, since the fastening torque TQ exceeded the last maximum value TQM, its current value is increased. From the beginning of the last half of the ON-time TN, since the fastening torque TQ was increased in some cases and was not increased in other cases, the current value is increased only intermittently. As a result, the entire current slope becomes gentle.

In an example shown in FIG. 6, concerning the current pulse DP12, for example, since the fastening torque TQ exceeded the last maximum value TQM near the middle of the ON-time TN, its current value is increased. Thereafter, since the fastening torque TQ is increased every time interval ts, the maximum value TQM is updated and the current value is increased.

Motor current i corresponding to the current pulse DP12 is increased up to the current value by the current command data D1T because of ON of the current pulse DP12, but at that time, the fastening torque TQ is small and the load is excessively small. Therefore, the speed is excessively increased and since the speed is limited, the motor current i is reduced by the limit circuit 27. Thereafter, the load appropriately acts, the speed is reduced and the motor current i is increased up to a value in accordance with the current command data D1T.

Near the end of the current pulse DP14, the fastening torque TQ reaches the target torque TQJ and the motor 11 is stopped at this time point.

As described above, in the screw fastening apparatus 1 of the present embodiment, the actual fastening torque TQ which is detected by the torque sensor 13 is fed back to the current value of the current command data D1T in the current control mode.

At that time, control for increasing the current value in accordance with a constant rate current slope θ and control for increasing the current value in accordance with increase in the actual fastening torque TQ are conducted at the same time.

More specifically, as described above, if the fastening torque TQ does not exceed the past maximum value TQM, the current value is maintained, and if the fastening torque TQ exceeds the past maximum value TQM, the current value is increased by a predetermined amount.

As a case where the fastening torque TQ did not exceed the maximum value TQM, there is proposed a case where a seat surface of a work or a screw surface of a bolt is crushed and torque is absorbed or a case where the screw fastening apparatus body 3 is deviated by the reaction force since the operator's holding manner of the screw fastening apparatus body 3 is not constant.

By conducting the above-described current control, optimal control suitable for a work can be conducted. Even if torque is weakened on the side of the work, or even if external force of the operator, or operation by the control or stop by the control is varied, the output torque of the motor 11 can be controlled in correspondence with increasing rate of the actual torque by the current value. Accordingly, it is possible to control the torque increase by the output energy, to ignore the increase or reduction in the rotation speed of the motor 11 and to fasten a screw precisely irrespective of a state of a work or operation.

Further, by changing the parameters, it is possible to easily control the target torque TQJ, precision in fastening, a degree of reaction force and the like. Further, since the oil pulse section and clutch mechanism which are conventional expendables are unnecessary, the maintenance is easy and the stability of the system can be maintained for a long term.

Furthermore, since the reaction force against the operator is reduced, even if the fastening torque TQ is excessively great, the operator can hold and use the screw fastening apparatus body 3 with one hand and high precision in fastening can be obtained.

Since the control is conducted with the electric motor 11, energy efficiency is high and it is possible to save energy and to clean out dust or mist more efficiently than the conventional oil pulse wrench which is prone to require air motor as a necessary condition.

The ON-time TN or/and OFF-time TF are variable in accordance with kind or state of a load so that the precision in fastening and the state of the reaction force can be set optimally.

In the above embodiment, the current slope θ is actually set as an increasing rate of a current command for increasing the current value up to the maximum value at a predetermined time TA. The current slope θ is an inclination of a straight line when the predetermined time T5 is set in a range of 0.1 to 2 sec, for example, and the current value is changed from zero to the maximum value in a predetermined time TA. Therefore, a value of the current slope θ is changed depending upon the setting of the time TA.

In the above embodiment, the structure, the shape, the number, the process contents and the processing order of entire part or each part of the screw fastening apparatus body 3, the control apparatus 4 and the screw fastening apparatus 1 can be changed appropriately without departing from the spirit and the scope of the invention.

INDUSTRIAL AVAILABILITY

According to the present invention, drawbacks of the conventional oil pulse wrench are improved and reaction force becomes smaller by using an electric motor. As a result, even if a fastening torque is great, it is possible to hold and use the screw fastening apparatus body with one hand and high precision in fastening can be obtained.

What is claimed is:

1. A control method of a screw fastening apparatus using an electric motor as a rotation driving source, comprising the steps of:

generating an output torque of the motor like pulses; together with detecting an actual torque at every predetermined time interval;

controlling the output torque such that the output torque is maintained when a detected torque value does not exceed a maximum value of the past detected torque values, and such that the output torque is increased by a predetermined amount when the detected torque value exceeds the maximum value of the past detected torque values; and stopping the motor when the detected torque value reaches a target value.

2. A control method of a screw fastening apparatus using an electric motor as a rotation driving source, comprising the steps of:

intermittently supplying current pulse to the motor; together with detecting an actual torque at every predetermined time interval;

maintaining a current value when a detected torque value does not exceed a maximum value of the past detected torque values and increasing the current value by a predetermined amount when the detected torque value exceeds the maximum value of the past detected torque values; and stopping the supply of the current pulse when the detected torque value reaches a target value.

3. The control method of the screw fastening apparatus according to claim 2, wherein the current pulse is such that ON-time and/or OFF-time thereof can be variably set.

4. The control method of the screw fastening apparatus according to claim 2 or 3, wherein size of the detected torque value is judged and an increase of the current value is calculated irrespective of ON and OFF of the current pulse.

5. The control method of the screw fastening apparatus, wherein the motor is controlled in speed and allowed to rotate at high speed until the screw seats and after the screw seats, the control described in claim 2 is conducted.

6. A control apparatus of a screw fastening apparatus using an electric motor as a rotation driving source, comprising:

a torque detector for detecting a fastening torque of the screw by the motor;

a setting section for setting a target value of the fastening torque;

a current command calculating section that intermittently supplies current pulse to the motor, as well as that calculates at predetermined time intervals to maintain a current value when a detected torque value does not exceed a maximum value of the past detected torque values and to increase the current value by a predetermined amount when the detected torque value exceeds the maximum value of the past detected torque values; and a stop control section for stopping the supply of the current pulse when the detected torque value reaches the target value.

7. A screw fastening apparatus comprising:

a screw fastening apparatus body using an electric motor as a rotation driving source, a torque detector for detecting a fastening torque of the screw by the motor, a setting section for setting a target value of the fastening torque, a current command calculating section that intermittently supplies current pulse to the motor, as well as that calculates at predetermined time intervals to maintain a current value when a detected torque value does not exceed a maximum value of the past detected torque values, and to increase the current value by a predetermined amount when the detected torque value exceeds the maximum value of the past detected torque values; and a stop control section for stopping the supply of the current pulse when the detected torque value reaches the target value.

* * * * *